Dec. 23, 1958  L. JOSEPH ET AL  2,865,098
TUBING AND PIPE CUTTER
Filed Jan. 2, 1958
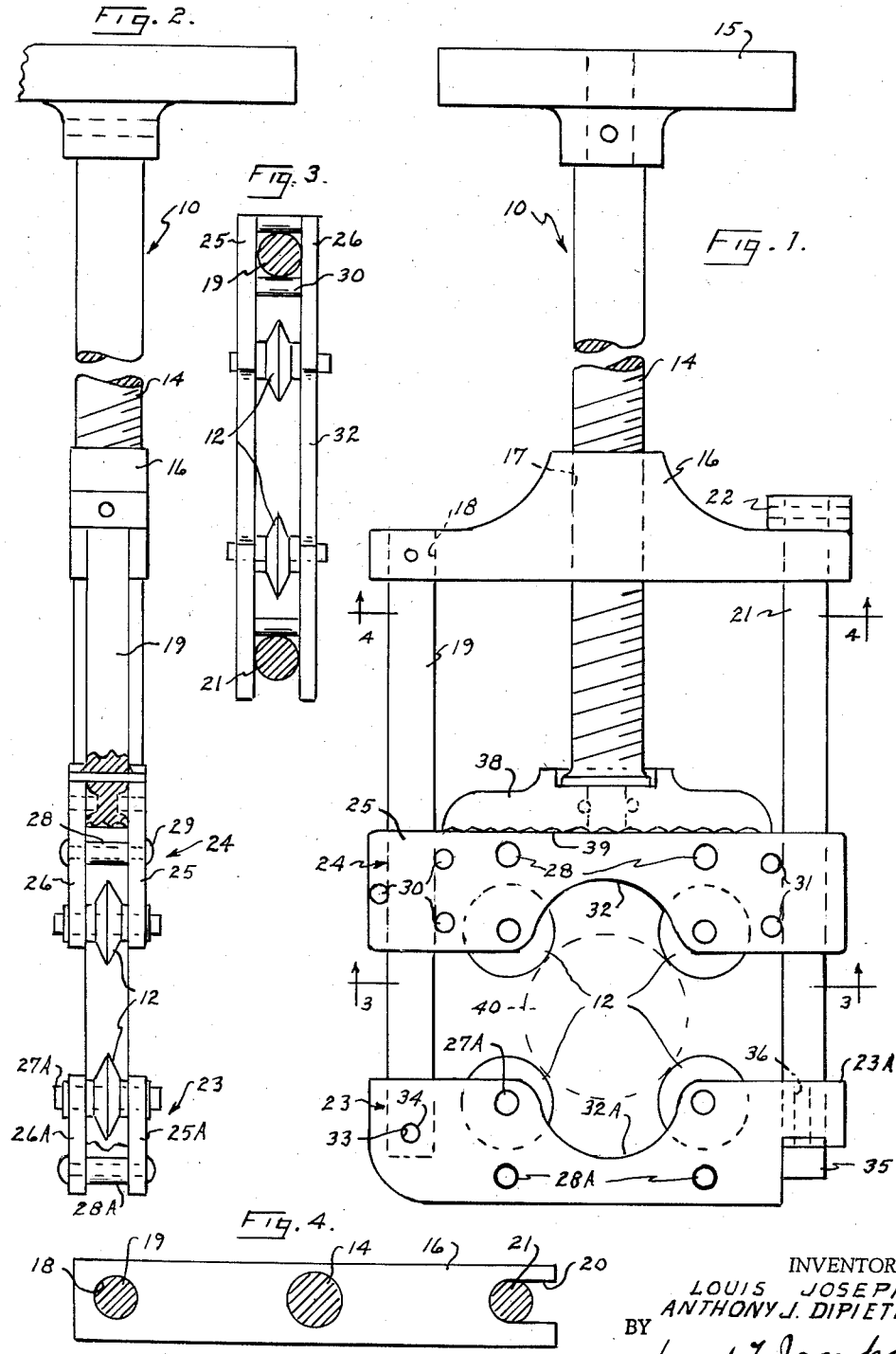
INVENTORS
LOUIS JOSEPH
ANTHONY J. DIPIETRO
BY Howard J. Jeandron
ATTORNEY

United States Patent Office 2,865,098
Patented Dec. 23, 1958

2,865,098

TUBING AND PIPE CUTTER

Louis Joseph and Anthony J. DiPietro, Brooklyn, N. Y.

Application January 2, 1958, Serial No. 706,625

3 Claims. (Cl. 30—101)

This invention relates to a tubing or pipe cutter, and more particularly to a tool that utilizes a plurality of cutting wheels, in which the tool is rotatably moved to roll the cutting wheels around the periphery of the pipe or tube, and in which the cutting wheels are held under a compressive force that may be regulated by the tool.

Various pipe cutters or tubing cutters are shown in the prior art. In most of the tools of this type three cutting wheels are used. Generally two of the wheels remain in a stationary position while the third wheel is movable to induce the compressive cutting force. The prior art also shows the use of four cutting wheels, but in every instance the tool has been constructed so that one end of the tool may be opened to thus position the tool over the pipe or tube to be cut. It has been found that where there is ample room to position and to completely rotate this type of tool, the cutters shown in the prior art are adequate. However, where there is limited space to position the cutting tool about the tube or pipe, the design of the cutters shown in the prior art is entirely inadequate, and where the degree of rotation of the tool is limited because of the limited space or position of the tube or pipe with relation to other apparatus, the cutters shown in the prior art are entirely inadequate.

It is an object of this invention to provide a tubing or pipe cutter that is provided with a plurality of cutting wheels and in which an element is provided to produce the desired compressive force on said cutting wheels, and in which the cutting wheels are spaced about said tubing or pipe to thus provide an equal degree of pressure on each cutter and a small arc of movement to produce a cutting operation around 360° of periphery.

It is a further object of this invention to provide a tubing or pipe cutter that is provided with a plurality of cutting wheels, in which one pair of said cutting wheels is affixed at one end of the tool and a second pair of said cutting wheels are mounted in opposed relation and are movable toward or away from said first pair of cutting wheels, and in which an element is provided to produce the desired compressive force on said cutting wheels, and in which the cutting wheels are spaced about said tubing or pipe to thus provide an equal degree of pressure on each cutter and a small arc of movement to produce a cutting operation around 360° of periphery.

It is a still further object of this invention to provide a tubing or pipe cutter that is provided with a plurality of cutting wheels, in which one pair of said cutting wheels is affixed at one end of the tool and a second pair of said cutting wheels are mounted in opposed relation and are movable toward or away from said first pair of cutting wheels, and in which said first pair of cutting wheels are pivotally mounted to one side of the tool so that they may be pivotally moved to an open position to allow the pipe or tube to be positioned in said tool, and in which the first pair of cutting wheels may be pivotally moved and locked in a closed position, and in which an element is provided to produce the desired compressive force on said cutting wheels, and in which the cutting wheels are equally spaced about said tubing or pipe to thus provide a small arc of movement to produce a cutting operation around 360° of periphery.

It is a still further object of this invention to provide a tubing or pipe cutter that is provided with a plurality of cutting wheels, in which one pair of said cutting wheels is affixed at one end of the tool and a second pair of said cutting wheels are mounted in opposed relation and are movable toward or away from said first pair of cutting wheels, and in which said first pair of cutting wheels are pivotally mounted to one side of the tool so that they may be pivotally moved to an open position to allow the pipe or tube to be positioned in said tool, and in which the first pair of cutting wheels may be pivotally moved and locked in a closed position, and in which the element provided to lock said first pair of cutting wheels in position may also be moved away from said tool to release both said first pair of cutting wheels and said second pair of cutting wheels to permit a pipe or tube to be introduced from the side of said cutter and said element may then be repositioned to retain said first pair of cutting wheels and said second pair of cutting wheels in their respective positions.

Further objects of this invention shall be apparent by reference to the accompanying detailed description and drawings in which:

Fig. 1 is a plan view of the tool;

Fig. 2 is a side elevational view taken in line 2—2 of Fig. 1;

Fig. 3 is a view taken on line 3—3 of Fig. 1; and

Fig. 4 is a cross-sectional view taken on line 4—4 of Fig. 1.

Referring to Figs. 1 and 2, there is illustrated a tubing or pipe cutter 10 that is comprised of a supporting framework 11, in which a plurality of wheel cutters 12 are mounted, and in which a threaded shaft 14 is provided to both position and exert a compressive force on the cutters 12. The shaft 14, at its outer end, is provided with a circular handle 15 that is rigidly affixed or anchored to shaft 14. The framework 11 is comprised of a main supporting casting 16 provided with a central threaded aperture 17 through which the threaded shaft 14 is mounted. Casting 16 is provided with an aperture 18 at one side thereof, to permit mounting a shaft 19, and shaft 19 is rigidly affixed to casting 16, in this example, by a pin. The opposite side of casting 16 is provided with a U-shaped slot 20 to permit mounting a shaft 21. Shaft 21 is not affixed in the U-shaped slot, but rather can be slipped into the position as illustrated in Fig. 1, and by threading the end of shaft 21 adjacent the U-shaped slot, a nut or stop element 22 can be affixed to the shaft 21. There are provided two similarly shaped elements 23 and 24, element 23 supporting a pair of the cutting wheels 12 in a freely rotatable position and in a spaced relationship, and element 24 is comprised of two plates 25 and 26; between the plates 25 and 26 a pair of cutter wheels 12, each being retained in a freely rotatable position by a pin 27. The plates are also held in this spaced relationship by a pair of spacer elements 28 and a pin 29 passing through both plates and the spacer elements. The pins 29, in turn, being riveted on their external ends. The upper end of element 24 is provided with a plurality of roller pins 30, positioned in spaced relationship so that when shaft 19 is passed between pins 30, element 24 will be held in position as illustrated, yet will be freely movable along the surface of shaft 19. The opposite end of element 24 is provided with an open end between plates 25 and 26, but is provided with a pair of rollers 31, which, in the position illustrated in Fig. 1, will bear against shaft 21 when it is in its locked working position as illustrated. Element 24 is provided with a cut out portion 32 between the pair of cutting wheels 12. Element 23 is similarly constructed with a pair of plates 25A and 26A, and of course the plates 25A and 26A are held in their spaced relationship identical to element 24, using a pair of spacers 28A and retaining a pair of cutting wheels 12 by means of a pair of pins 27A, and, as in element 24, the central section 32A is cut out between the cutting wheels. Element 23 differs from element 24 in that the upper end, Fig. 1, is provided with a pair of apertures 33 so that a pin 34 can be passed through both apertures and through an aperture in the end of shaft 19, thus supporting element 23 in a pivotal relationship to shaft 19. It is also to be noted that element 23 at its opposite or lower end, Fig. 1, is shorter than element 24 and is provided with a pair of identical parallel portions 23A, the portions 23A lying on either side of shaft 21. At the extreme end of shaft 21, adjacent to the portions 23A, there is provided a bolt 35 that is threadably secured in a bore 36 in shaft 21, so that the head of bolt 35 will abut with the adjacent edges 36 of portions 23A. It is to be noted that the edges 36 have been cut into the face of portions 23A so that the head of bolt 35 will fit into the cut out portion. This not only provides the locking means for shaft 21, but prevents shaft 21 from dropping out of its locked relationship even when the tool is in a released position. Referring back to shaft 14, it is to be noted at its bearing end there is provided an enlarged shoe 38, shoe 38 on its bearing face 39, bearing against the edges of element 24. The operation of the tool 10 is quite simple; with the tool in the assembled relationship as shown in Fig. 1, shaft 21 may be easily slipped out of slot 20 and out of its retained relation with element 24, and may likewise be lifted off the locked cut out portion 36 or portions 23A, and element 24 will remain in the position as illustrated, but element 23 may be pivotally moved outward to assist in passing the pipe or tube into the central position between the plurality of cutters 12 as indicated by a dotted line 40. When the pipe or tube 40 has been positioned, element 23 may be pivotally moved back to the position as illustrated, and of course if element 24 is too far to the left to permit element 23 to return to this position, element 24 may be moved to the right by turning handle 15 counter-clockwise to allow the clearance necessary for element 24 to be moved back until element 23 has reached the position as illustrated. The shaft 21 may be reinserted by slipping it into position between portions 23A and between plates 26 of element 24 and into U-shaped slot 20 of casting 16. When shaft 21 is in the position as illustrated and the pipe or tube 40 is in the position illustrated by the dotted line, handle 15 may be rotated clockwise, thus applying pressure on element 24, and at the same time providing a pull on both shafts 12 and 21 to pull element 23 towards element 24. Thus, the cutter wheels 12 will be forced with an equal degree of pressure into the pipe or tube 40, and by moving the handle 15 and shaft 14 in an arc to rotate about the pipe or tube 40, the cutting wheels 12 will penetrate or cut into the surface and will continue to cut through the thickness of the pipe or tube as the pressure is increased on the cutters by further clockwise rotation of handle 15. It is to be noted that with four cutting wheels the tool 10 does not have to be rotated more than slightly over 90° to provide an equal cutting operation over the complete 360° periphery of the pipe or tube. The main feature of this tool is the ability to position this tool in its open relationship about a pipe or tube such as the exhaust pipe of an automobile, where there is very little clearance and where the tool will just about have room for a small degree of pivotal movement. Of course, when the tool has been inserted over the exhaust pipe and shaft 21 has been positioned as shown, the cutter is simply forced into its bearing or cutting relationship by handle 15, and due to its limited degree of movement the exhaust pipe may be cut regardless of the small or limited space around the exhaust pipe. In similar fashion, the tool may be used in many inaccessible positions for the average pipe or tube cutter. It is also to be noted that although the cutting element may be easily spread to permit passing the pipe or tube into a cutting position, the tool in its closed relationship is exceptionally strong and rigid, and in addition the pair of cutters on element 24 are held in a very exact alignment with the pair of cutters on element 23. Likewise, each cutter on element 23 is retained in perfect alignment, and each cutter on element 24 is retained in perfect alignment so that the cutting operation of each rotary cutter is in a complementary order on an exact axis.

Various changes may be made to the cutting tool as described; that is, it may be of any desired size, and various changes may be made in the general structure, as long as the cutting elements are spaced in a desired relationship about the periphery of the pipe or tube, and are held on exact cutting axis, without departing from the spirit of this invention, and although the tool is shown as easily opened on one side to permit affixing the tool over and around a pipe or tube, either side of the tool may be provided as the releasable side or both sides of the tool may be similarly releasable. In this instance, the end 23 would be removable, and the number of cutters utilized may be changed as long as the general number is retained, without departing from the spirit of this invention, and this invention shall be limited only by the appended claims.

What is claimed is:

1. A cutting tool for tubular elements which includes a central supporting element, a first and second shaft attached to said element in spaced relationship, said first shaft permanently affixed and said second shaft removable, a threadably mounted operating screw with a handle affixed at one end thereof, said operating screw threaded through said central element and provided with a rotatably supported shoe at its opposite end, a pair of yokes, said first yoke pivotally affixed at one end on the end of said first shaft and means to retain the opposite end of said yoke on the end of said second shaft, said second yoke slidably guided at both ends between said two shafts and slidably positioned between said central element and said first yoke, said first and second shafts retained in parallel spaced relationship, a plurality of cutting wheels, one pair of cutting wheels mounted on said first yoke and another pair of cutting wheels mounted on said second yoke, said first and second yokes positioned with the cutting wheels in opposed relation, said cutting wheels rotatably mounted on said yokes and protruding beyond the surface of said yokes, said shoe abutting with one side of said second yoke to provide the means to impress the desired cutting pressure in operation of said cutter.

2. In a device according to claim 1, in which said first yoke is provided with means at its free end to lock with the end of the second shaft while being pivotally attached to the first shaft, and in which the second yoke is provided with means at one end to slidably embrace said first shaft and means at the opposite end to slidably abutt with one side of the second shaft, and in which said central element is provided with a U-shaped cut out at one side thereof to permit said second shaft ot be attached to said central element, and means to remove said second shaft from its mounted position to open said tool for the positioning of a tubular element between the cutting wheels.

3. In a device according to claim 1, in which the first and second yokes are each constructed with a pair of parallel spaced plates retained in this relationship by a plurality of spacers, and said cutting wheels being removably mounted in said respective yokes.

References Cited in the file of this patent

UNITED STATES PATENTS

| | | |
|---|---|---|
| 262,534 | Conway | Aug. 8, 1882 |
| 1,428,288 | Kestley | Sept. 5, 1922 |
| 2,325,353 | Wright | July 22, 1943 |
| 2,456,882 | Mackey | Dec. 21, 1948 |
| 2,739,381 | Petersen | Mar. 27, 1956 |
| 2,747,275 | Johasson | May 29, 1956 |